US008429365B2

(12) United States Patent
Lin et al.

(10) Patent No.: US 8,429,365 B2
(45) Date of Patent: Apr. 23, 2013

(54) MEMORY DEVICE AND METHOD FOR EMBEDDING HOST-IDENTIFICATION INFORMATION INTO CONTENT

(75) Inventors: Jason T. Lin, Santa Clara, CA (US); Alexander Kanaris, San Gabriel, CA (US); Joseph E. Halpern, Santa Clara, CA (US)

(73) Assignee: SanDisk Technologies Inc., Plano, TX (US)

( * ) Notice: Subject to any disclaimer, the term of this patent is extended or adjusted under 35 U.S.C. 154(b) by 518 days.

(21) Appl. No.: 12/492,751

(22) Filed: Jun. 26, 2009

(65) Prior Publication Data

US 2010/0332723 A1 Dec. 30, 2010

(51) Int. Cl.
*G06F 12/00* (2006.01)
*G06F 13/00* (2006.01)
*G06F 13/28* (2006.01)

(52) U.S. Cl.
USPC ............... 711/164; 711/163; 726/26; 726/29; 713/176

(58) Field of Classification Search ............... 711/163, 711/164; 726/26, 29; 713/176
See application file for complete search history.

(56) References Cited

U.S. PATENT DOCUMENTS

| 5,329,618 | A | * | 7/1994 | Moati et al. ................ 709/245 |
| 6,009,176 | A | | 12/1999 | Gennaro et al. |
| 6,523,114 | B1 | | 2/2003 | Barton |
| 6,553,127 | B1 | | 4/2003 | Kurowski |
| 6,912,315 | B1 | * | 6/2005 | Wong et al. .................. 382/232 |
| 7,036,020 | B2 | | 4/2006 | Thibadeau |
| 7,215,771 | B1 | | 5/2007 | Hamlin |
| 7,426,747 | B2 | | 9/2008 | Thibadeau |
| 7,493,656 | B2 | | 2/2009 | Goodwill et al. |
| 2001/0001613 | A1 | * | 5/2001 | Hashimoto ............. 375/240.18 |
| 2002/0056118 | A1 | | 5/2002 | Hunter et al. |
| 2002/0186842 | A1 | | 12/2002 | Sabet-Sharghi et al. |
| 2003/0009669 | A1 | | 1/2003 | White et al. |
| 2003/0046238 | A1 | | 3/2003 | Nonaka et al. |

(Continued)

FOREIGN PATENT DOCUMENTS

| EP | 1 014 618 | 6/2000 |
| GB | 2 330 031 | 4/1999 |

(Continued)

OTHER PUBLICATIONS

"Efficient Traitor Tracing," http://search.yahoo.com/search;_ylt=A0oGkm6ppQdJXXYB1ltXNyoA?p=IBM+research+technical+paper+efficient+traitor+tracing&y=Search&fr=&ei=UTF-8, 14 pages, Oct. 4, 2006.

(Continued)

*Primary Examiner* — Stephen Elmore
*Assistant Examiner* — Mark Giardino, Jr.
(74) *Attorney, Agent, or Firm* — Brinks Hofer Gilson & Lione

(57) ABSTRACT

A memory device and method for embedding host-identification information into content are disclosed. In one embodiment, a memory device is provided comprising a memory operative to store content and a controller in communication with the memory. The controller is operative to receive a credential comprising host-identification information from a host in communication with the memory device, authenticate the host using the credential, receive a request from the host to play content stored in the memory, embed the host-identification information into the content, and send the content with the embedded host-identification information to the host.

21 Claims, 8 Drawing Sheets

U.S. PATENT DOCUMENTS

| | | | |
|---|---|---|---|
| 2003/0056101 A1 | 3/2003 | Epstein | |
| 2003/0159043 A1 | 8/2003 | Epstein | |
| 2003/0161473 A1* | 8/2003 | Fransdonk | 380/277 |
| 2003/0187674 A1 | 10/2003 | Odgers et al. | |
| 2003/0190054 A1 | 10/2003 | Troyansky et al. | |
| 2004/0098593 A1 | 5/2004 | Muratani | |
| 2004/0158828 A1 | 8/2004 | Zimmer et al. | |
| 2005/0039022 A1 | 2/2005 | Venkatesan et al. | |
| 2005/0063540 A1 | 3/2005 | Hsiung | |
| 2005/0097329 A1 | 5/2005 | Morimoto et al. | |
| 2005/0193205 A1 | 9/2005 | Jacobs et al. | |
| 2006/0005029 A1 | 1/2006 | Petrovic et al. | |
| 2006/0095792 A1 | 5/2006 | Hurtado et al. | |
| 2006/0126891 A1 | 6/2006 | Seroussi et al. | |
| 2006/0285687 A1 | 12/2006 | Kawada et al. | |
| 2007/0033419 A1 | 2/2007 | Kocher et al. | |
| 2007/0047442 A1 | 3/2007 | Snyder | |
| 2007/0053549 A1 | 3/2007 | Miller et al. | |
| 2007/0067242 A1 | 3/2007 | Lotspiech et al. | |
| 2007/0220266 A1 | 9/2007 | Cooper et al. | |
| 2007/0283448 A1 | 12/2007 | Green | |
| 2008/0130886 A1 | 6/2008 | Kocher et al. | |
| 2008/0133938 A1 | 6/2008 | Kocher et al. | |
| 2008/0250120 A1 | 10/2008 | Mick et al. | |
| 2009/0049558 A1 | 2/2009 | Lotspiech | |
| 2010/0034513 A1* | 2/2010 | Nakano et al. | 386/94 |

FOREIGN PATENT DOCUMENTS

| | | |
|---|---|---|
| WO | WO 99/62022 | 12/1999 |
| WO | WO 2008/013656 | 1/2008 |
| WO | WO 2009/070430 A2 | 6/2009 |

OTHER PUBLICATIONS

"Advanced Access Content System," http://en.wikipedia.org/wiki/Advanced_Access_Content_System, 7 pages, last modified Jul. 21, 2009.

"Traitor Tracing," http://en.wikipedia.org/wiki/Traitor_tracing, 2 pages, last modified Mar. 31, 2009.

"AACS: Sequence Keys and Tracing," http://freedom-to-tinker.com/blog/felten/aacs-sequence-keys-and-tracing, 6 pages, Jan. 17, 2007.

"An Overview of the Advanced Access Content System (AACS)," http://www.cacr.math.uwaterloo.ca/techreports/2007/cacr2007-25.pdf, 24 pages, 2007.

"Storage Device and Method for Dynamic Content Tracing," U.S. Appl. No. 12/608,747, Inventor: Fabrice E. Jogand-Coulomb, filed: Oct. 29, 2009; effective filing date: Oct. 31, 2008.

Chor et al., "Tracing Traitors", *IEEE Transactions on Information Theory*, vol. 46, No. 3, May 1, 2000, pp. 893-910.

International Search Report and Written Opinion for PCT Application Serial No. PCT/US2009/062735, dated Jan. 25, 2010, 10 pages.

International Search Report and Written Opinion for PCT Application Serial No. PCT/US2010/038458, dated Sep. 15, 2010, 10 pages.

Notice of Allowance for U.S. Appl. No. 12/608,747, dated Nov. 1, 2012, 4 pages.

Office Action for U.S. Appl. No. 12/608,747, dated Jun. 19, 2012, 18 pages.

Jonker, W. et al., "Digital Rights Management in Consumer Electronics Products", *IEEE Signal Processing Magazine, Special Issue on Digital Rights Management*, vol. 21, No. 2, Mar. 2004, pp. 82-91.

Traw. C.B.S., "Protecting Digital Content Within the Home", *Computer*, vol. 34, No. 10, Oct. 2001, pp. 42-47.

* cited by examiner

US 8,429,365 B2

MEMORY DEVICE AND METHOD FOR EMBEDDING HOST-IDENTIFICATION INFORMATION INTO CONTENT

BACKGROUND

In some content protection systems, a media device (e.g., a Blu-ray Disc) provides a host player (e.g., a Blu-ray Disc player) with encrypted digital content (e.g., a high-definition movie) for decryption and playback. The content contains many sets of duplicate video frames that are nearly identical to one another but have some slight variation. There are many alternate navigation paths through these duplicate frames, and the host player selects a particular navigation path based on the device key of the group it belongs to within the key tree structure of the Media Key Block of the host player. Accordingly, the specific ones of the duplicate frames rendered by the host player provide a unique signature (or "watermark") from which to identify the host player. In this way, if a content title were to be pirated, the pirated copy can be analyzed to determine the navigation path that was used and, thus, the identity of the particular host player that generated the pirated copy. Once the compromised host player is identified, the host player's certificate and key can be revoked, so that the host player will no longer be able to decrypt (and possibly pirate) further content, thereby containing the potential revenue loss of the content provider due to the host player's security breach. For example, new certificate revocation lists can be distributed with future releases of content, so that the compromised host player will be disabled when it attempts to play a new content title. However, the effectiveness of the solution is measured by the number of recovered content it takes to precisely detect the compromised host player in the ecosystem. This leads to a delay in detecting the compromised host player and also contains a probabilistic detection of the absolute guilty device.

These content protection systems can face a "fox guarding the hen house" problem in that the entity responsible for injecting the watermark into the content is the compromised host player itself. Accordingly, there is a concern that once the host player is compromised to allow content to be pirated, it may be further compromised to remove the watermark injection functionality.

SUMMARY

Embodiments of the present invention are defined by the claims, and nothing in this section should be taken as a limitation on those claims.

By way of example, the embodiments described below generally relate to a memory device and method for embedding host-identification information into content. In one embodiment, a memory device is provided comprising a memory operative to store content and a controller in communication with the memory. The controller is operative to receive a credential comprising host-identification information from a host in communication with the memory device, authenticate the host using the credential, receive a request from the host to play content stored in the memory, embed the host-identification information into the content, and send the content with the embedded host-identification information to the host.

Other embodiments are provided, and each of the embodiments can be used alone or together in combination. Various embodiments will now be described with reference to the attached drawings.

DETAILED DESCRIPTION OF THE PRESENTLY PREFERRED EMBODIMENTS

Introduction

By way of introduction, the following embodiments generally relate to a memory device and method for embedding host-identification information into content played from the memory device. In these embodiments, the host-identification information is provided by the host to the memory device as part of a credential used to authenticate the host to the memory device. The host-identification used during the authentication process can be securely and directly injected into the content by the memory device to achieve precise and instant detection of a compromised host. That is, the embedded host-identification information enables a content owner to identify the host that produced a pirated copy of its content and revoke that host's certificate and key, so that the host will no longer be able to decrypt (and possibly pirate) further content. Further, because it is the memory device—not the host—that is responsible for embedding the host-identification information into the content, these embodiments overcome the "fox guarding the hen house" problem encountered with content protection systems that rely upon a compromised host to police itself. This approach does not interfere with the host-driven approach, so both can exist simultaneously.

Overview of Embedding Host-Identification Information

Figure 1:
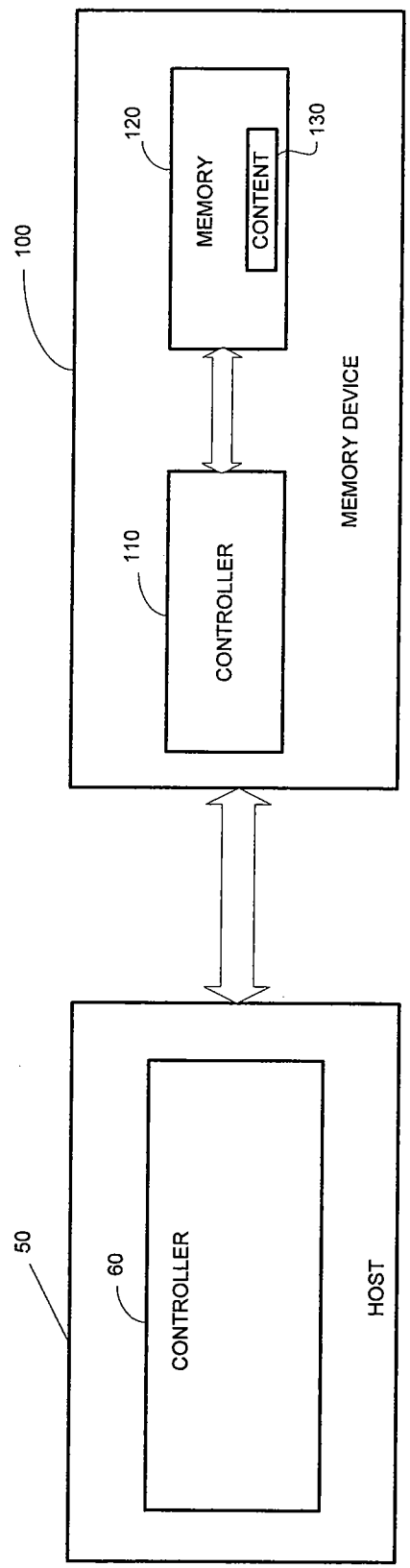
FIG. 1 is a block diagram of a host and a memory device of an embodiment.

Turning now to the drawings, FIG. 1 is a block diagram of a host 50 and a memory device 100 of an embodiment. As shown in FIG. 1, the memory device 100 comprises a controller 110 and a memory 120 operative to store content 130. "Content" can take any suitable form, such as but not limited to, digital video (with or without accompanying audio) (e.g., a movie, an episode of a TV show, a news program, etc.), audio (e.g., a song, a podcast, one or a series of sounds, an audio book, etc.), still or moving images (e.g., a photograph, a computer-generated display, etc.), text (with or without graphics) (e.g., an article, a text file, etc.), a video game or other software, and a hybrid multi-media presentation of two or more of these forms.

The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. Examples of various components that can be used in a controller are described in the embodiments discussed below and are shown in the associated drawings. The controller 110 can also be implemented as part of the memory 120 control logic.

The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. Although shown as single components in FIG. 1, the controller 110 and/or memory 120 can be implemented with several components. Further, the memory device 100 can contain other components, which are not shown in FIG. 1 to simplify the drawings. In one embodiment, the memory device 100 takes the form of a handheld, removable memory card (e.g., a flash storage card); however, the memory device 100 can take other forms, such as, but not limited to, a solid-state drive and a universal serial bus (USB) device.

As shown in FIG. 1, the memory device 100 is in communication with the host device 50. As used herein, the phrase "in communication with" means directly in communication with or indirectly in communication with through one or more components, which may or may not be shown or described herein. The host 50 can take any suitable form, such as, but not limited to, a dedicated content player, a mobile phone, a personal computer (PC), a game device, a personal digital assistant (PDA), a kiosk, and a TV system. Preferably, the memory device 100 is removably connected to the host 50, so a user can use the memory device 100 with a variety of hosts.

Figure 2:
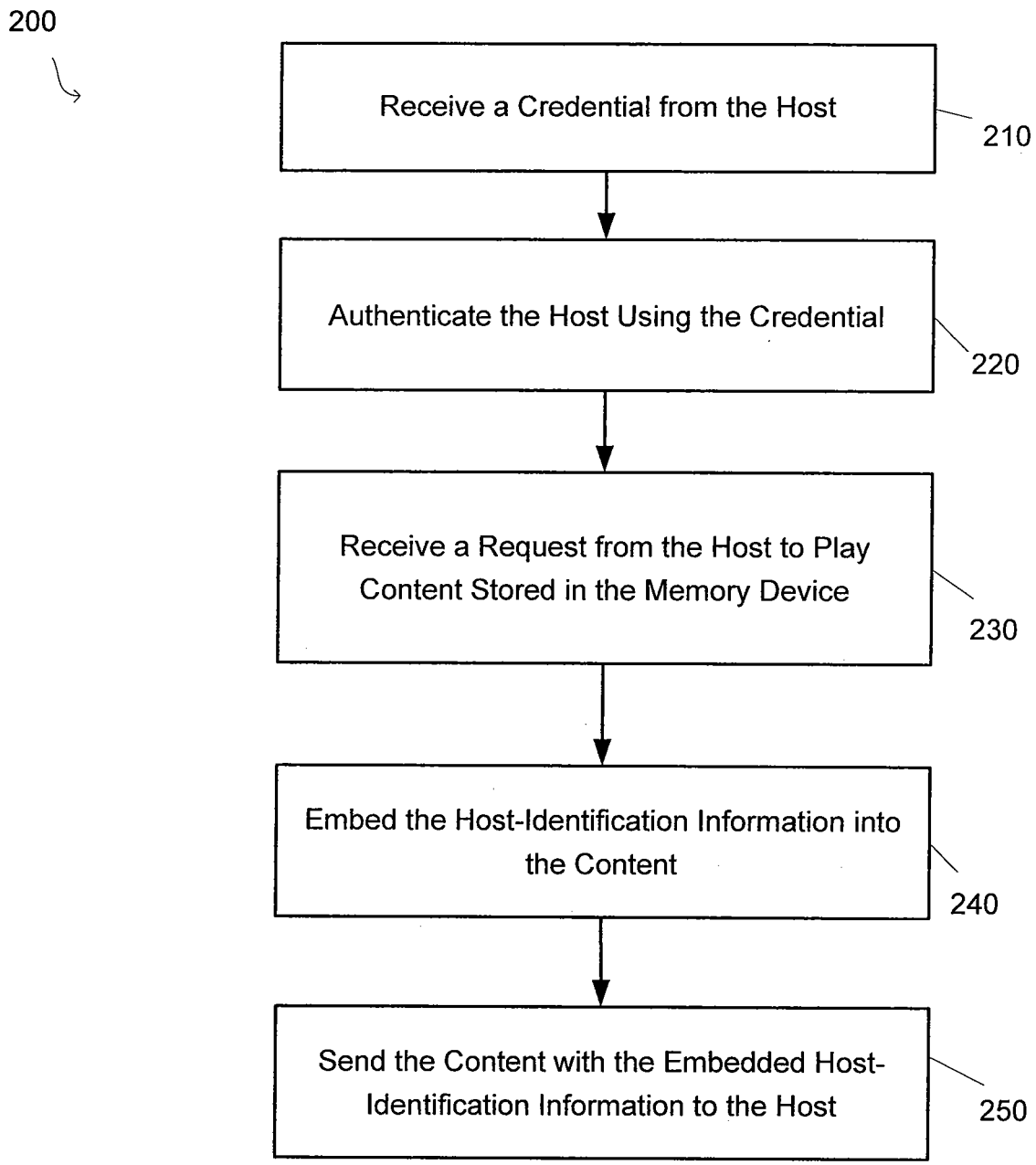
FIG. 2 is a flow chart of a method of an embodiment for embedding host-identification information into content.

FIG. 2 is a flow chart 200 of a method of an embodiment for embedding host-identification information into content using the memory device 100. As shown in the flow chart 200, the controller 110 in the memory device 100 receives a credential from the host 50 (act 210) and authenticates the host 50 using the credential (act 220). (Preferably, mutual authentication and key exchange are performed, in which case the memory device 100 would provide its own credential to the host 50 for authentication.) The credential that the host 50 provides to the memory device 100 contains information that identifies the host 50 ("host-identification information"), such as a serial number, a random number, unique information about where, when, and/or how the host 50 was manufactured, etc. The credential can be part of a public key infrastructure ("PKI") certificate that binds a public key with the host-identification information and is used during the authentication process to verify that the public key belongs to the host 50. Next, the memory device 100 receives a request from the host 50 to play content 130 stored in its memory 120 (act 230). (It should be noted that the acts discussed herein can be performed in any suitable order. For example, the memory device 100 can receive the request to play the content 130 before or after receiving the credential from the host 50 or can receive the request along with the credential.) The memory device 100 then embeds (i.e., "injects") the host-identification information received from the host 50 during host authentication into the content (act 240). The memory device 100 then sends the content with the embedded host-identification information to the host 50 (act 250). In one embodiment, the memory device 100 embeds the host-identification information into the content "on-the-fly" in real-time during playback of the content (i.e., as the content is being output to the host 50). Accordingly, acts 240 and 250 are performed simultaneously. In an alternate embodiment, the memory device 100 sends the content to the host 50 only after it has completed embedding the host-identification information into all desired locations in the content (i.e. acts 240 and 250 are performed sequentially).

One advantage associated with this embodiment is that if the host 50 were to pirate the played content, the host-identification information would allow the content owner to identify the host 50 as the player that pirated the content and can revoke the host's 50 certificate and key, so that the host 50 will no longer be able to decrypt (and possibly pirate) further content, thereby containing the potential revenue loss of the content provider due to the host's 50 security breach. That is, once the compromised content is made available for mass distribution, the content owner can extract the compromised host's identification information by comparing the compromised content with an original "gold" copy or by using a specialized software tool. The identification of the compromised host then can be passed to a Certification Authority to revoke or blacklist that particular host. Another advantage is that because it is the memory device 100—not the host 50—that is responsible for embedding the host-identification information into content in these embodiments, this content protection system avoids the "fox guarding the hen house" problem encountered with content protection systems that rely upon a compromised host to police itself.

Exemplary Embedding Techniques

As discussed above, in these embodiments, the memory device 100 embeds host-identification information into content provided to the host 50 for playback. FIGS. 3A-3E illustrate five exemplary embedding techniques: (1) embedding host-identification information in a last frame of a group of pictures ("GOP") in a series of GOPs, (2) embedding host-identification information in unreferenced frames, (3) embedding host-identification information in unreachable GOPs, (4) embedding host-identification information in "user data" packets, and (5) embedding host-identification information in unreferenced streams in a system layer. These exemplary embedding techniques will be described in the following paragraphs. It should be noted that these techniques are merely examples and that other techniques can be used. Accordingly, a specific type of embedding technique should not be read into the claims unless explicitly recited therein. Further, as will be described in more detail below, one or more than one embedding technique can be used during a playback session or across playback sessions to provide a dynamic content protection system. Also, instead of using a single embedding technique at a given time, a combination of embedding techniques can be used.

Before turning to these exemplary embedding techniques, it should be noted that the memory device 100 can determine location(s) in the content in which to embed the host-identification information using any suitable technique. For example, the memory device 100 can determine embedding location(s) by recognizing/parsing the file system on the memory device 100 using video file analyzer code (or hardware logic) stored in the memory device 100. In this way, the memory device 100 would analyze the content to determine a location in the content in which to embed the host-identification information. Such a memory device 100 will be referred to herein as being "file system aware." Alternatively, the memory device 100 can determine embedding location(s) by identifying an address using a look-up table that is generated for that particular content and correlates addresses with particular video file objects. Such a memory device 100 will be referred to herein as being "file system agnostic." The look-up table can be generated by the content owner and stored with the content on a freshly-manufactured memory device (or on a pre-used memory device that is freshly formatted). Alternatively, as will be discussed in more detail below, a content loading system can generate a look-up table for a "used" memory device by analyzing the memory device's file system (e.g., by analyzing existing fragmentation and FAT cluster assignments in order to update the lookup table provided by the content owner). In any event, in situations where a look-up table is used, it is preferred that the content be stored in the memory device 100 in a write-protected manner to prevent applications, such as a defragmenter, from moving data around in the content, which would invalidate the look-up table. Also, the following discussion assumes that write-once memory devices and re-writable memory device can be treated as functionally equivalent by the memory device's firmware even though there may be slight variations in how write-once memory devices and re-writable memory devices handle data.

Figure 3A:
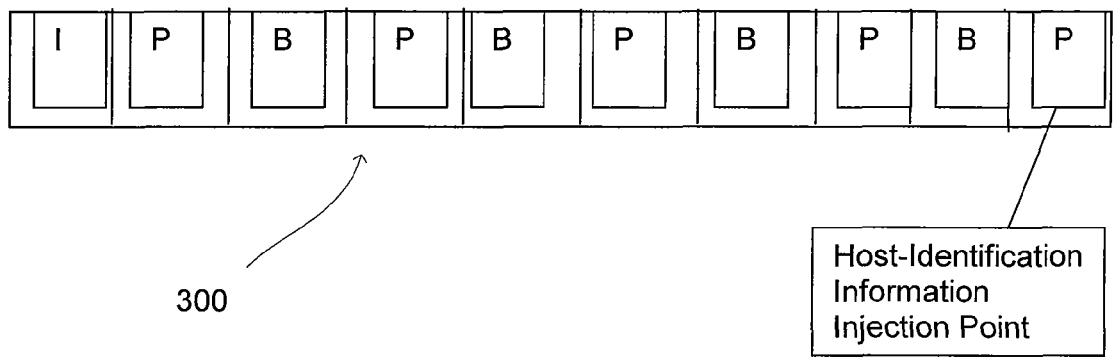
FIGS. 3A-3E illustrate exemplary embedding techniques that can be used with these embodiments.

Returning to the drawings, FIG. 3A illustrates an embedding technique in which the memory device 100 embeds data in a last frame of a group of pictures ("GOP") 300 in a series of GOPs. A GOP is a sequence of frames of digital video in an MPEG-encoded digital video stream, where each frame is a set of luminance values that a video rendering device (e.g., a television set) displays at the same time or at approximately the same time, rendering a frame that results in the displaying of a picture. A GOP starts with an intra-frame (or "I-Frame") that contains a data set that is sufficient to describe every luminance value in a frame. A GOP also contains a progressive frame (or "P-Frame") that contains a data set that, when combined with the data sets of N previous frames, yields a data set that is sufficient to describe every luminance value in a frame. A GOP additionally contains a bidirectional frame (or "B-Frame") that contains a data set that, when combined with the data set of N previous frames and N subsequent frames, yields a data set that is sufficient to describe every luminance value in a frame.

The memory device 100 can identify the last frame of the GOP 300 in any suitable manner. For example, if the memory device 100 is file system aware, embedded firmware in the memory device 100 can identify the location of the last frame in the GOP 300 by recognizing/parsing the file system on the memory device 100 using video file analyzer code stored in the memory device 100. In this scenario, the memory device 100 can identify the beginning of the content file and the first GOP within the file by parsing information from the file system to identifying the Logical Block Addresses (LBAs) that belong to a file. The memory device 100 can identify each GOP as well as a sequence of GOPs in a file even when the file is split over non-consecutive LBAs by following the file system pointers that link the file to its corresponding LBAs. On the other hand, if the memory device 100 is file system agnostic, the memory device 100 can determine the last frame of the GOP by using a look-up table. In this situation, the memory device 100 can be designed to parse raw data from sectors with the additional capability of identifying the beginning of a GOP and the respective members of the GOP. GOP boundaries can be identified by scanning the data contained in monotonically-increasing sectors on the memory device 100 based on their LBA. Any GOP that can not be identified in its entirety within a range of monotonically-increasing LBAs in the raw memory device data can be bypassed as unsuitable for marking.

It should be noted that the host-identification information embedded by the memory device 100 can be contained entirely within one GOP 300 or can be distributed over several GOPs with a data rate that can be as low as one data bit per GOP. Maximal obfuscation of embedded data can be achieved by encoding such data in exponential-Golomb coded syntax elements. Also, error correcting code (ECC), such as multiple layers of the extended binary Golay code or equivalent, can be employed in encoding the host-identification information in order to increase tamper resistance by way of extensive redundancy.

Figure 3B:
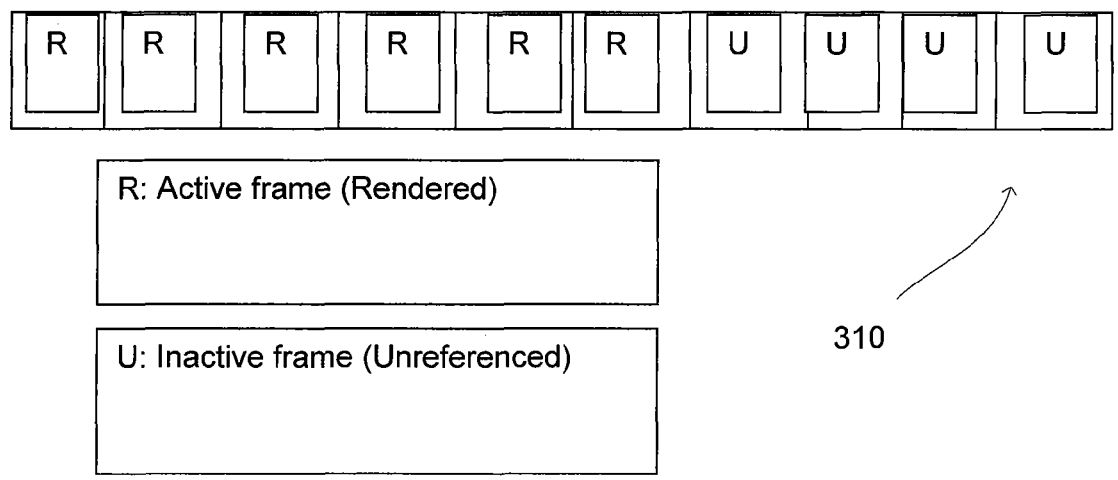

Returning to the drawings, FIG. 3B illustrates embedding host-identification information in unreferenced frames in a group of pictures 310. An unreferenced frame is a frame data set that is an integral part of the video stream that a navigation path (i.e., a path specified by a data set or data stream that controls the sequencing of the video rendering process) specifically excludes from rendering. Alternatively, an unreferenced frame can be a frame data set that is unreachable through all available navigation paths. While a referenced frame is an active frame that is rendered, an unreferenced frame is an inactive frame due to navigation constraints and, thus, is available to be used to store host-identification information. In one embodiment, unreferenced frames are specifically generated as a placeholder for host-identification information by a video encoder before loading the content into the memory device 100. The memory device's 100 operations (whether the memory device 100 is file system agnostic or file system aware) are similar to those described above. Further, ECC can be employed as described above with respect to the previously-described techniques.

Figure 3C:
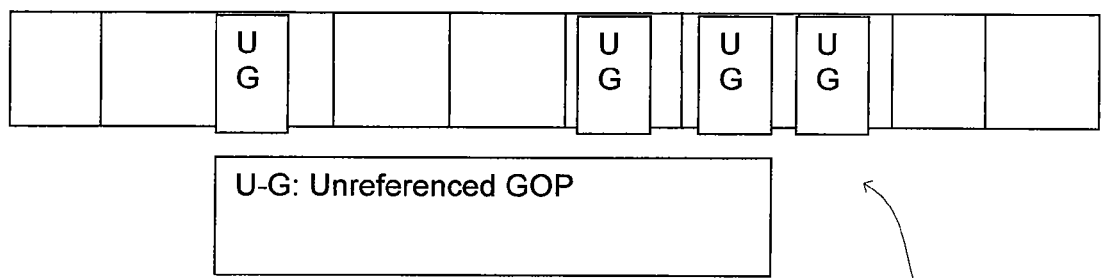

FIG. 3C illustrates embedding host-identification information in an unreferenced (or "unreachable") group of pictures (GOPs) in a series of GOPs 320. An unreferenced GOP is similar to an unreferenced frame in that both are unplayable due to navigation-imposed constraints. That is, an unreferenced GOP is a set of frames belonging to a single GOP that is an integral part of the video stream that the navigation stream specifically excludes from rendering. Alternatively, an unreferenced GOP can be a GOP that is unreachable through all available navigation paths. Accordingly, this embedding technique is similar to the technique in which host-identification information is embedded in an unreferenced frame. However, this technique may be faster than the unreferenced-frame technique because it may require fewer CPU cycles to implement, as it is relatively simple to identify the beginning of a GOP, as compared to an unreferenced frame. Also, ECC can be employed as described above with respect to the previously-described technique.

Figure 3D:
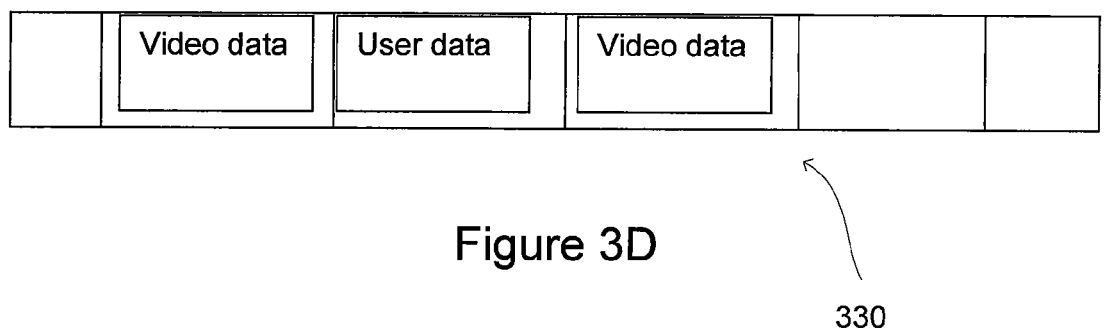

FIG. 3D illustrates an embedding technique in which host-identification information is embedded in user data fields (packets) in a video stream 330. The term "user data" describes a data set that is an integral part of the video stream 330 which the reference decoder specifically excludes from processing and, consequently, from displaying in any way. Typically, user data fields are defined in the reference implementation of a decoder as placeholders for future enhancements. Accordingly, user data fields can be specifically generated as a placeholder for host-identification information by a video encoder before loading the content into the memory device 100. The memory device's 100 operations (whether the memory device 100 is file system agnostic or file system aware) are similar to those described above. Further, ECC can be employed as described above with respect to the previously-described techniques.

Figure 3E:
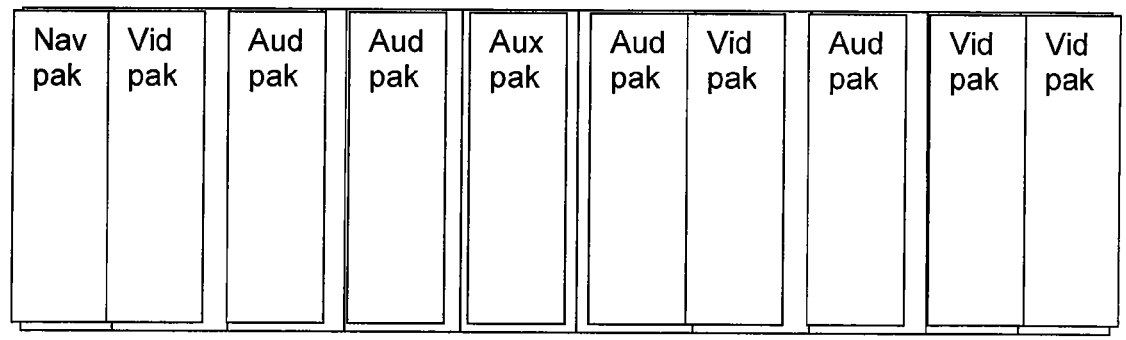

FIG. 3E illustrates an embedding technique in which host-identification information is embedded in unreferenced streams in the system layer 340. The system layer 340 describes a data set that consists of the time or space multiplex of data stream and/or packets of different GOP sequences within a digital video stream. A data stream describes a data set that contains a homogeneous collection of data objects of a certain type (e.g., audio data, video data, navigation data, or auxiliary data). Such streams may or may not be related to each other. A packet describes a data set that is identifiable by explicit data patterns (bit-patterns) that are inserted as a prefix and/or a suffix to a partial data set that consists of a fragment of data produced by the video encoder (a partial data set may or may not be a self-contained data object). As with the above-described techniques, the unreferenced stream can be specifically generated as a placeholder for host-identification information by a video encoder before loading the content into the memory device 100. Also, the memory device's 100 operations (whether the memory device 100 is file system agnostic or file system aware) are similar to those described above, and ECC can be employed as described above with respect to the previously-described techniques.

It should again be noted that the embedding techniques described above are merely examples and that other embedding techniques can be used. Further, while the memory device 100 can be configured to perform a single embedding technique, the memory device 100 can be configured to perform multiple embedding techniques. Specifically, it is presently preferred that the memory device 100 be configured to dynamically embed host-identification information into content by implementing different embedding techniques as the content is being played during a playback session or upon each playback session of the content. Varying the embedding techniques can be an effective countermeasure to attackers who compare compromised content from multiple hosts to locate (and then contaminate or remove) embedded host-identification information. That is, if an attacker trying to gain unauthorized access to content could reliably identify the "watermarks" (i.e., the embedded host-identification information), he would be able to contaminate or remove them. For example, if an attacker compromised more than one platform, he could quickly find out that the bit-streams are not identical, which would alert him to the fact that some type of attacker-tracing information could be present in the bit stream. The attacker can then modify or erase any data that is different, thereby removing the host-identification information from the pirated content. An attacker could even potentially erase the host-identification information from a single video stream if the amount of obfuscation is insufficient or non-existent. However, by adaptively altering the embedding technique used through a playback session and/or across playback sessions, enough diversity is introduced into pirated content that the host-identification information cannot be easily identified from a simple comparison.

Any suitable adaptive algorithm can be used to vary the method or combination of the methods used to embed host-identification information. Examples of factors that can be used to determine the embedding method and locations include, but are not limited to, the unique certification host ID (i.e., the host-identification information itself), the memory device certificate, and prior playback and injection session information stored in a history log in the memory device 100. Also, any suitable event can trigger the altering of the embedding method or combination of methods. For example, the memory device 100 can initiate a session with the host 50 to modify the embedding algorithm after a certain playback duration (e.g., after a ten-minute period, after 100 MB are played, or after a video chapter is encountered).

Exemplary Memory Device

The memory device of these embodiments can be implemented in any suitable manner. The following paragraphs and referenced drawings described one exemplary implementation. It should be understood that this implementation is merely an example and that details shown and described herein should not be read into the claims unless explicitly recited therein.

Figure 4:
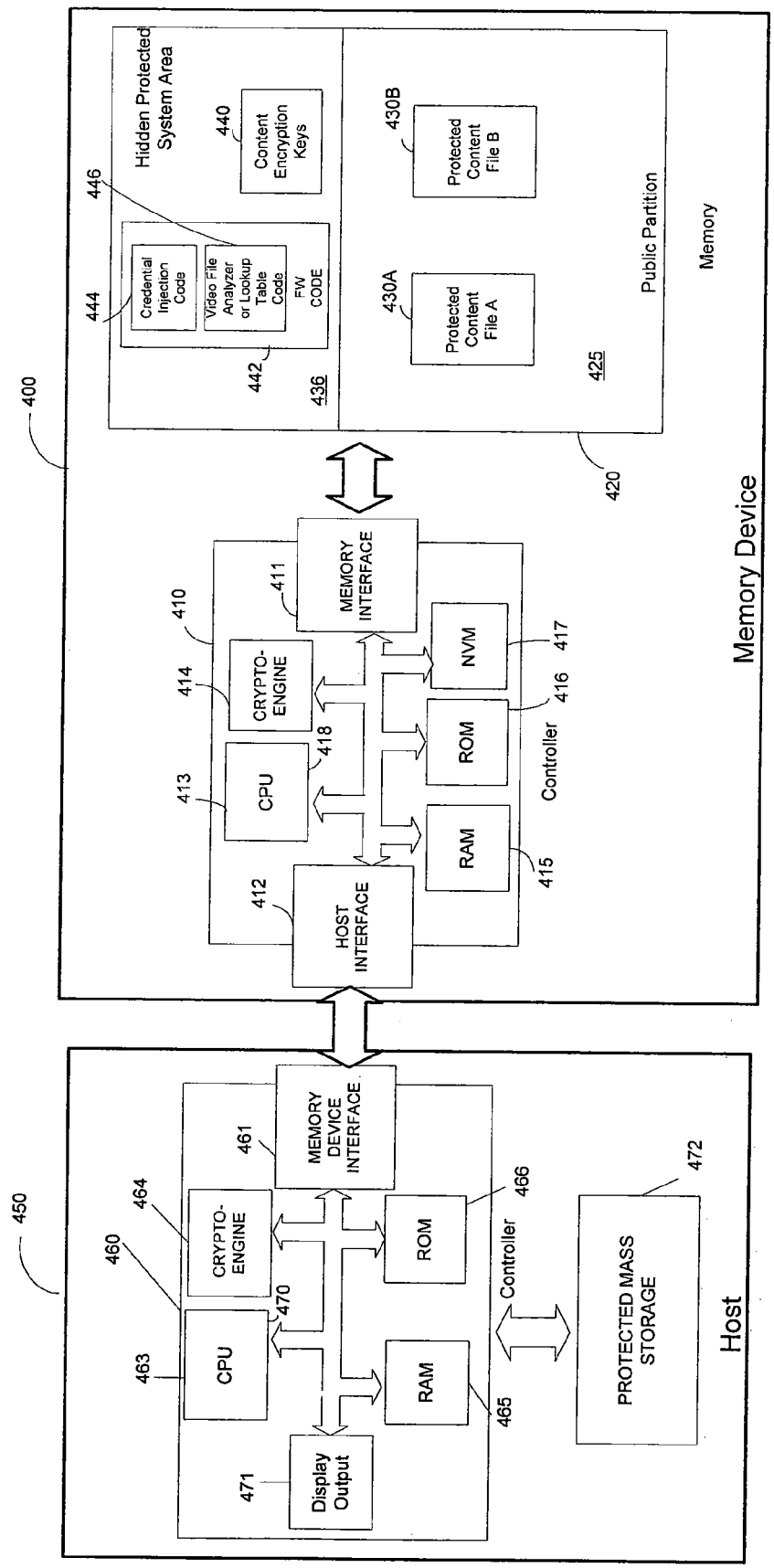
FIG. 4 is a block diagram of a host and a memory device of an embodiment.

Returning to the drawings, FIG. 4 is a block diagram of a memory device 400 and host 450 of an embodiment. As shown in FIG. 4, the memory device 400 comprises a controller 410 and a memory 420. The controller 410 comprises a memory interface 411 for interfacing with the memory 420 and a host interface 412 for interfacing with the host 450. The controller 410 also comprises a central processing unit (CPU) 413, a crypto-engine 414 operative to provide encryption and/or decryption operations, read access memory (RAM) 415, read only memory (ROM) 416 which stores firmware (logic) for the basic operations of the memory device 400, and a non-volatile memory (NVM) 417 which stores a device-specific key used for encryption/decryption operations. It should be noted that the memory device-specific key can be stored in other memory areas within the memory device. The components shown in FIG. 4 can be implemented in any suitable manner. However, it is presently preferred that the memory device controller 410 have sufficient CPU 413 processing power to execute an algorithm that is either file system aware with intelligence to parse a video file format or is able to use an address lookup table in order to inject watermarks, as will be described below.

In this embodiment, the memory 420 comprises a public partition 425 that is managed by a file system on the host 450 and a hidden protected system area 435 that is internally managed by the controller 410. The hidden protected system area 435 stores content encryption keys (CEKs) 440 and firmware (FW) code 442 (e.g., credential injection code 444 and video file analyzer or lookup table code 446). The public partition 425 and the hidden protected system area 435 can be part of the same memory unit or can be different memory units. The hidden protected system area 435 is "hidden" because it is internally managed by the controller 410 (and not by the host controller 460) and is "protected" because objects stored in that area 435 are encrypted with the unique key stored in the non-volatile memory 417 of the controller 410. (The memory device hardware unique key can be stored in the non-volatile memory 417 of the controller 410 or other areas within the memory device 400.) Accordingly, to access objects stored in that area 435, the controller 410 would use the crypto-engine 414 and the key stored in the non-volatile memory 417 to decrypt the encrypted objects. Preferably, the memory device 300 takes the form of a secure product from the family of products built on the TrustedFlash™ platform by SanDisk Corporation.

The public partition 425 of the memory stores protected content files 430A, 430B. In this embodiment, the content files 430A, 430B, which can be different versions (e.g., resolution) of the same content title, are provided by a content provider and are released to a content replication and ingestion facility, which loads the content files 430A, 430B in the public partition 425. (Instead of the content 430A, 430B being preloaded in the memory device 420, the content files 430A, 430B can be side-loaded or downloaded into the memory device 420 using a content loading system, such as a kiosk or a PC connected to the Internet.) While the public partition 425 of the memory 420 is managed by a file system on the host 450, objects stored in the public partition 425 (such as the content files 430A, 430B) may also be protected by the memory device 400. In this embodiment, both stored content files 430A, 430B are protected by respective content encryption keys 440 stored in the hidden protected system area 435, and those keys 440 are themselves protected by the memory-device unique key stored in the non-volatile memory 417 of the controller 410. Accordingly, to unprotect one of the protected content files (say, content file 430A), the crypto-engine 414 would use the memory-device unique key stored in the non-volatile memory 417 of the controller 410 to decrypt the appropriate content encryption key 440 and then use the decrypted content encryption key 440 to decrypt the protected content 430A.

Turning now to the host 450, the host 450 comprises a controller 460 that has a memory device interface 461 for interfacing with the memory device 400. The controller 460 also comprises a central processing unit (CPU) 463, a crypto-engine 464 operative to provide encryption and/or decryption operations, read access memory (RAM) 465, read only memory (ROM) 466, and display output circuit 471. It should be noted that each component in box 460 can be implemented as separate chips in the overall host system. The host 450 also comprises protected mass storage 472.

The memory device 400 and the host 450 communicate with each other via a memory device interface 461 and a host interface 412. For operations that involve the secure transfer of data, it is preferred that the crypto-engines 414, 464 in the memory device 400 and host 450 be used to mutually authenticate each other and provide a key exchange. The mutual authentication process calls for the host 450 and memory device 400 to exchange unique certification IDs (as explained herein, the host's unique certification ID is the host-identification information that is embedded in the content). After mutual authentication is complete, it is preferred that a session key be used to establish a secure channel for communication between the memory device 450 and host 400. Alternatively, the memory device 400 and host 450 can support broadcast-encryption-type security in order to have the host 450 provide its credential for the memory device 400 to inject into the content.

Figure 5:
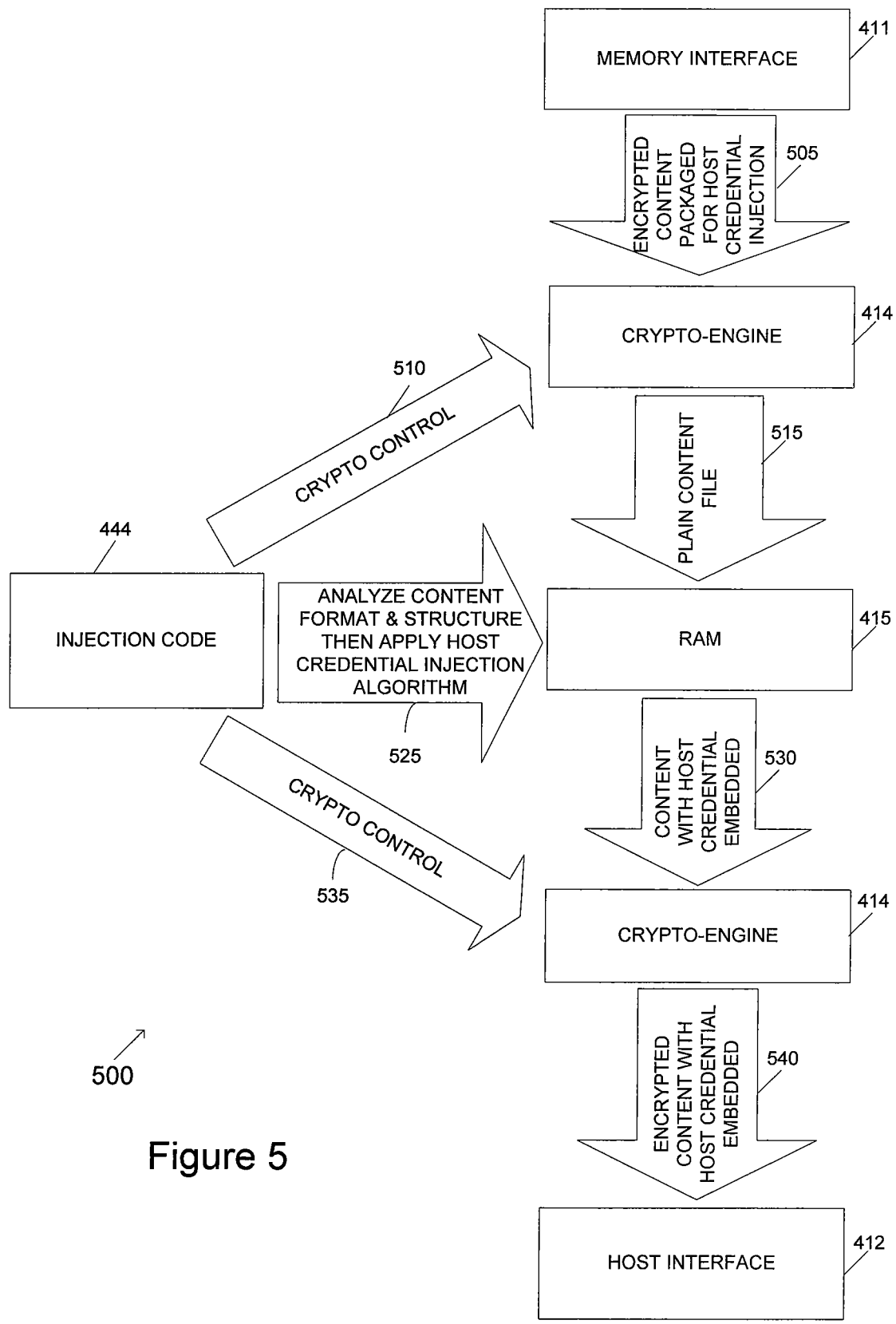
FIG. 5 is a flow chart of a method of an embodiment for embedding host-identification information into content using a memory device that is file system aware
Figure 6:
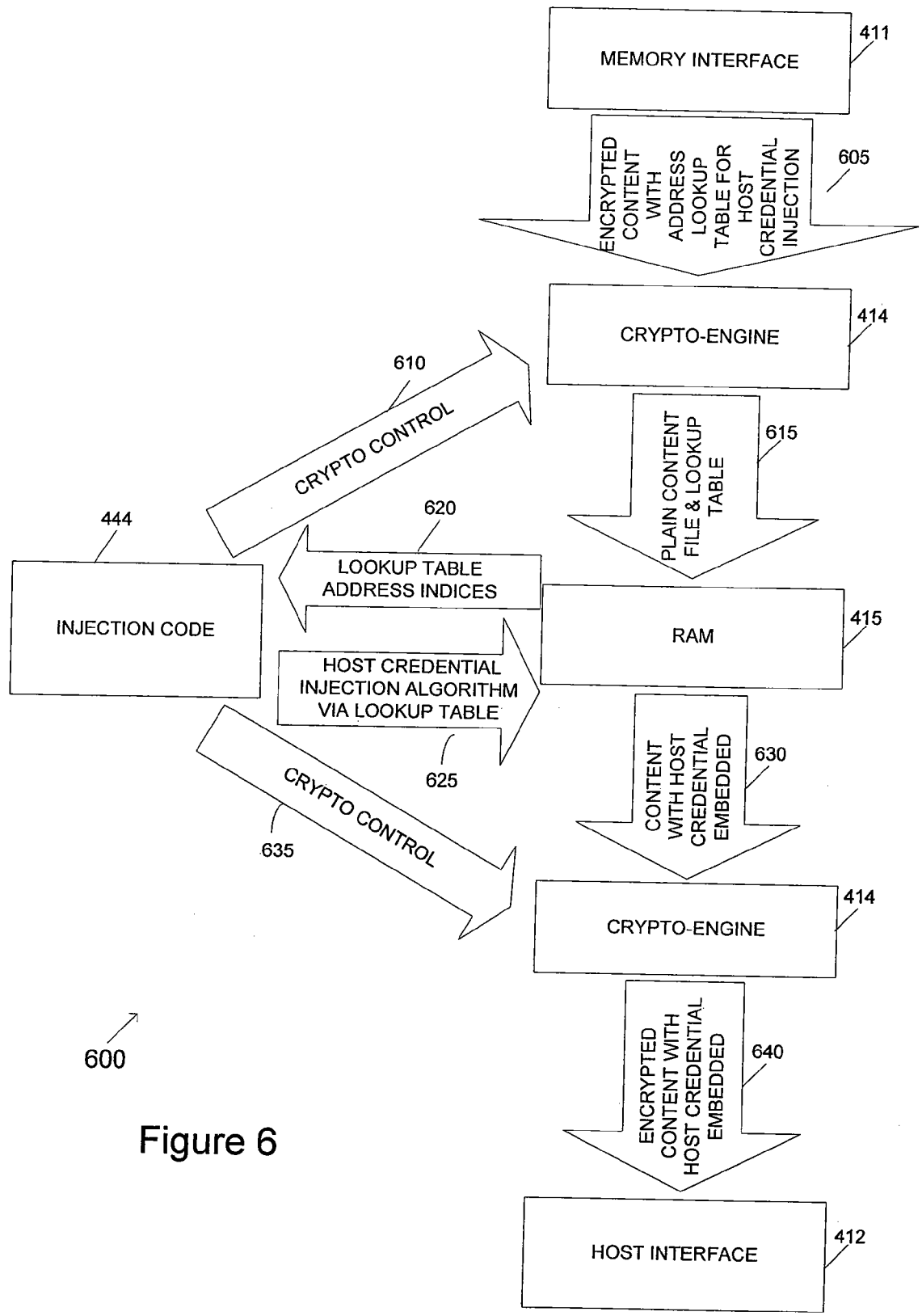
FIG. 6 is a flow chart of a method of an embodiment for embedding host-identification information into content using a memory device that is file system agnostic.

As mentioned above, the memory device 400 in this embodiment can be used to embed host-identification information into content. FIGS. 5 and 6 are flow charts 500, 600 illustrating the acts of this method when the memory device 400 is file system aware (FIG. 5) and file system agnostic (FIG. 6). Turning first to FIG. 5, when the host 450 sends a command to the memory device 400, the protected (encrypted) content 430A is sent to the crypto engine 414 (act 505). The injection code 444 sends crypto control commands to the crypto-engine 414 (act 510), in response to which the crypto-engine 414 uses the memory-device unique key in the non-volatile memory 417 to decrypt the content encryption key 440, which the crypto-engine 414 uses to decrypt the protected content 430A. The decrypted "plain" content file 430A is then sent to the controller's RAM 415 (act 515). The injection code 444 analyzes the content format and structure and applies a host credential injection algorithm (i.e., a host-identification information embedding technique) (act 525). Specifically, because the memory device 400 is file system aware, the video file analyzer 446 in the memory device 400 analyzes and identifies instances of data within the content to determine location(s) for embedding host-identification information in accordance with the algorithm. The content with the embedded host credential is then sent to the crypto-engine 414 (act 530). The injection code 444 sends a crypto control command to the crypto-engine 414 to encrypt the content with the embedded host credential (act 535). The encrypted content with the embedded host credential is then sent to the host interface 412 for transfer to the host 450 (act 540). The host 450 receives, processes, and decodes the video content without being watermark aware.

In FIG. 5, the memory device 100 was file system aware and was able to analyze the content format and structure to apply the appropriate host credential injection algorithm. However, not all memory devices have a firmware module (or hardware logic) to enable an intelligent file system and video file format parser to determine the location of injection. In these situations, an index table particular to specific content can be used to determine the location of injection. FIG. 6 is a flow chart 600 of the use of such a "file system agnostic" memory device.

As shown in FIG. 6, when the host 450 sends a command to the memory device 400, the protected (encrypted) content 430A and the address lookup table 446 are provided to the crypto-engine 414 (act 605). The injection code 444 sends crypto control commands to the crypto-engine 414 (act 610), in response to which the crypto-engine 414 uses the memory-device unique key in the non-volatile memory 417 to decrypt the content encryption key 440, which the crypto-engine 414 uses to decrypt the protected content 430A. The decrypted "plain" content file 430A and the lookup table are then sent to the controller's RAM 415 (act 615). The injection code 444 then reads the lookup table address indices 446 (act 620) and applies a host credential injection algorithm via the lookup table (act 625). In other words, the injection code 444 uses the lookup table with address indices 446 to identify instances of data within the content for embedding host-identification information in accordance with the algorithm. The content with the embedded host credential is then sent to the crypto-engine 414 (act 630), which, in response to a crypto control command from the injection code 414 (act 635), encrypts the content with the embedded host credential and provides it to the host interface 412 for transfer to the host 450 (act 640).

Content Loading Embodiments

Content can be authored to support one or more host-identification information embedding techniques (such as, but not limited to, the embedding techniques discussed above). For example, a content authoring tool can randomly inject unreferenced frames, unreachable GOPs, user data packets, and unreferenced system streams throughout the content file during content file creation. For a memory device that is file system aware (e.g., that has file system and file header parsing capabilities), no additional information is required from the authoring tool. However, for a memory device that is not capable of being file system aware, the authoring tool can provide a logical address index table of each synthetic data type for watermark injection along with the content. As discussed above, the index table can be used by the memory device's firmware to embed host-identification information based on LBA and byte addresses. As also discussed above, to preserve the integrity of the look-up table, the content can be write-protected to prevent applications, such as a defragmenter, from moving data around in the content, which would invalidate the look-up table.

If the content and the look-up table are pre-loaded into a newly-manufactured or freshly-formatted memory device, the memory device is free of fragmentation and file allocation table cluster assignments, so the look-up table generated by the content provider is accurate. However, since the look-up table is generated for a fresh memory device, a problem can occur if the memory device is not fresh but rather was previously used to store (or delete) content. In this situation, existing file system structures in the memory device will render the LBA entries in the look-up table out-of-date. This can occur, for example, when a user buys a memory device pre-loaded with content and then writes and erases additional content on remaining free space in the memory device. If the user later side-loads or downloads new content and a lookup table from a content loading system (e.g., a kiosk or a PC connected to the Internet), the lookup table will not be consistent with the existing file system structures in the memory device. In this situation, it is preferred that the content loading system analyze the memory device for existing file system structures for fragmentation and file allocation table cluster assignment and then update the look-up table accordingly. That is, the content loading system would be responsible for loading the content, loading the index file (if one exists), and possibly manipulating the index file to match the existing file system and cluster allocation of the memory device.

Figure 7:
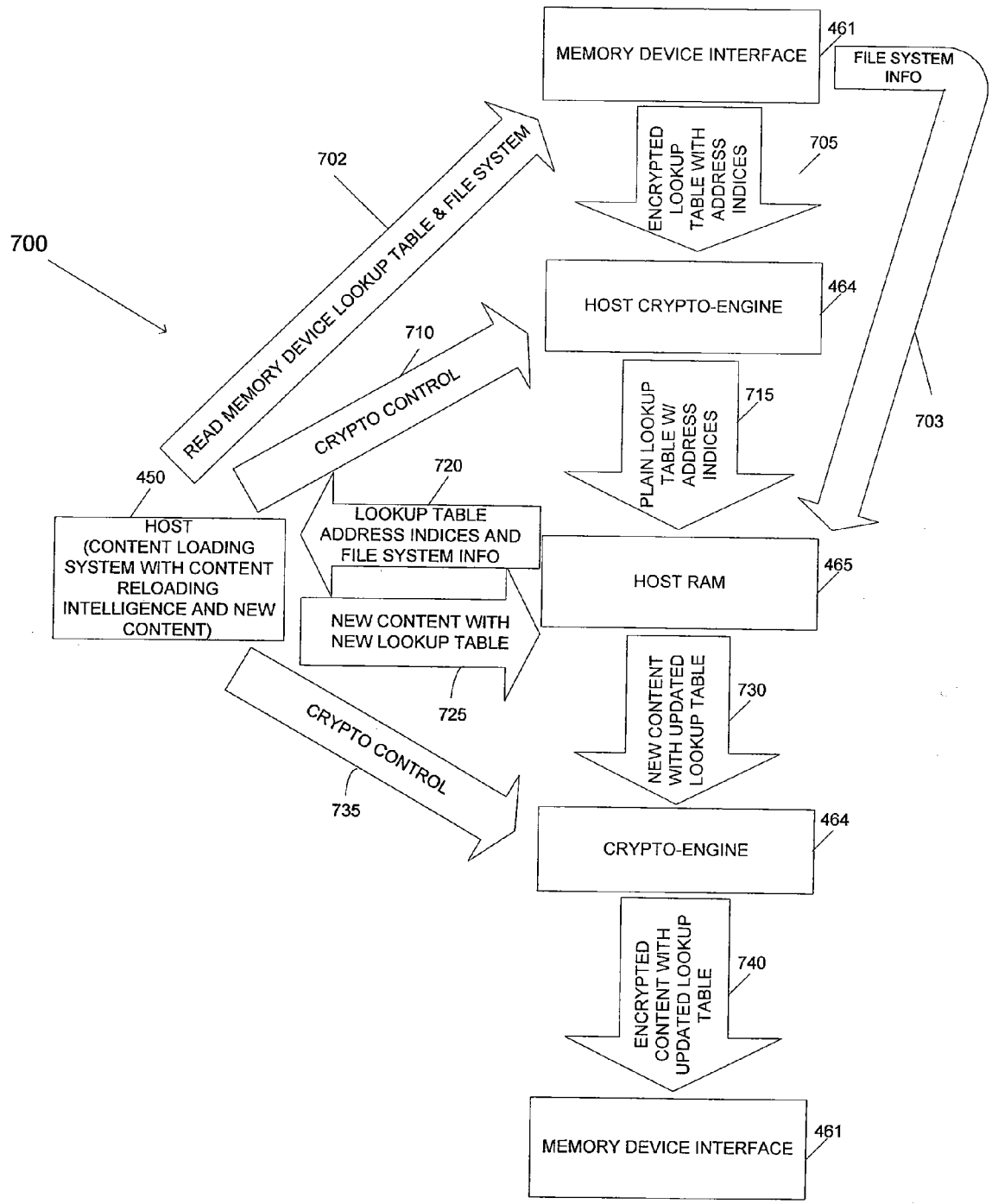
FIG. 7 is a flow chart of a method of an embodiment for using a content loading system to update a look-up table.

FIG. 7 provides a flow chart 700 of such a method. In FIG. 7, the "host" refers to the host 450 in FIG. 4. Instead of being used to render played content from the memory device 400, the host 450 here is used as a content loading system/machine, such as a kiosk, a PC connected to the Internet, a mobile handset downloading over the air, or a set-top box/TV/game console acquiring content from Internet or from a broadcast network. As shown in FIG. 7, in response to a request from the host 450 to read the memory device lookup table and file system (act 702), the memory device 400 provides the host's RAM 465 with file system information, such as the FAT tables and fragmentation information (act 703). The memory device controller 410 then provides the encrypted lookup table with address indices to the host crypto engine 464 (act 705), which based on crypto control from the host 450 (act 710) decrypts the lookup table and provides it to the host's RAM 465 (act 715). The host 450 then reads the lookup table address indices and file system information (act 720) and provides new content with a new lookup table to the host's RAM 465 (act 725). The host 450 then sends the new content with the updated lookup table to its crypto-engine 464 (act 730), which encrypts those items based on a crypto control command (act 735). The host 450 then provides the encrypted content with the updated lookup table to the memory device interface 461 (act 740) for loading into the memory device 400.

Conclusion

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A memory device comprising:
    a memory operative to store content; and
    a controller in communication with the memory, wherein the controller is configured to:
        receive a credential from a host in communication with the memory device, wherein the credential comprises host-identification information;
        authenticate the host using the credential;
        receive a request from the host to play content stored in the memory;
        dynamically select one or more of the following embedding methods: embedding the host-identification information in a last frame of a group of pictures (GOP), embedding the host-identification information in an unreferenced frame, embedding the host-identification information in an unreachable group of pictures (GOP), embedding the host-identification information in a user data field, and embedding the host-identification information in an unreferenced stream in a system layer;
        determine locations in the content in which to embed the host-identification information by either analyzing the content or by using a look-up table associated with the content, depending on whether the memory device is file system aware;
        embed the host-identification information into the content into the determined locations based on the selected embedding method as the content is being played; and
        send the content with the embedded host-identification information to the host.

2. The memory device of claim 1, wherein the controller is configured to embed the host-identification information into the content in real-time during playback of the content.

3. The memory device of claim 2, wherein the controller is configured to vary how the host-identification information is embedded into the content as the content is being played.

4. The memory device of claim 1, wherein the controller is configured to vary how the host-identification information is embedded into the content upon each playback session of the content.

5. The memory device of claim 1, wherein the content is pre-loaded into the memory device and the look-up table is provided by a content owner.

6. The memory device of claim 1, wherein the content and look-up table are loaded into the memory device by a content loading system, and wherein the content loading system updates the look-up table to account for existing file system structures in the memory device.

7. The memory device of claim 1, wherein the content is write-protected to protect the integrity of the look-up table.

8. The memory device of claim 1, wherein the controller is operative to analyze the content to determine a location in the content in which to embed the host-identification information.

9. The memory device of claim 1 further comprising a firmware or hardware logic module operative to analyze video encoding and file container structures.

10. The method of claim 1, wherein the memory device comprises a firmware or hardware logic module operative to analyze video encoding and file container structures.

11. The memory device of claim 1, wherein the memory device is local to the host when the memory device is in communication with the host.

12. A method for embedding host-identification information into content, the method comprising:
    performing in a controller of a memory device, the memory device comprising a memory operative to store content:
        receiving a credential from a host in communication with the memory device, wherein the credential comprises host-identification information;
        authenticating the host using the credential;
        receiving a request from the host to play content stored in the memory;
        dynamically selecting one or more of the following embedding methods: embedding the host-identification information in a last frame of a group of pictures GOP), embedding the host-identification information in an unreferenced frame, embedding the host-identification information in an unreachable group of pictures (GOP), embedding the host-identification information in a user data field, and embedding the host-identification information in an unreferenced stream in a system layer;
        determining locations in the content in which to embed the host-identification information by either analyzing the content or by using a look-up table associated with the content, depending on whether the memory device is file system aware;

embedding the host-identification information into the content into the determined locations based on the selected embedding method as the content is being played; and sending the content with the embedded host-identification information to the host.

13. The method of claim 12, wherein the host-identification information is embedded into the content in real-time during playback of the content.

14. The method of claim 13 further comprising varying how the host-identification information is embedded into the content as the content is being played.

15. The method of claim 12 further comprising varying how the host-identification information is embedded into the content upon each playback session of the content.

16. The method of claim 12 further comprising determining a location in the content in which to embed the host-identification information by using a look-up table.

17. The method of claim 16, wherein the content is pre-loaded into the memory device and the look-up table is provided by a content owner.

18. The method of claim 16, wherein the content and look-up table are loaded into the memory device by a content loading system, and wherein the content loading system updates the look-up table to account for existing file system structures in the memory device.

19. The method of claim 16, wherein the content is write-protected to protect the integrity of the look-up table.

20. The method of claim 12 further comprising analyzing the content to determine a location in the content in which to embed the host-identification information.

21. The method of claim 12, wherein the memory device is local to the host when the memory device is in communication with the host.

* * * * *